(12) United States Patent
Tillmann et al.

(10) Patent No.: US 9,239,708 B2
(45) Date of Patent: Jan. 19, 2016

(54) CONTEXTUALLY INTELLIGENT CODE EDITING

(75) Inventors: Nikolai Tillmann, Redmond, WA (US); Jonathan P. de Halleux, Seattle, WA (US); Barend H. Venter, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 447 days.

(21) Appl. No.: 12/979,839

(22) Filed: Dec. 28, 2010

(65) Prior Publication Data

US 2012/0167042 A1   Jun. 28, 2012

(51) Int. Cl.
   G06F 9/44   (2006.01)

(52) U.S. Cl.
   CPC .................................. G06F 8/33 (2013.01)

(58) Field of Classification Search
   None
   See application file for complete search history.

(56) References Cited

U.S. PATENT DOCUMENTS

| | | | | |
|---|---|---|---|---|
| 5,623,613 | A  * | 4/1997 | Rowe et al. | 715/841 |
| 6,131,102 | A  * | 10/2000 | Potter | 715/257 |
| 6,305,008 | B1 | 10/2001 | Vaidyanathan et al. | |
| 6,314,559 | B1 | 11/2001 | Sollich | |
| 6,389,592 | B1 * | 5/2002 | Ayres et al. | 717/172 |
| 6,424,983 | B1 * | 7/2002 | Schabes et al. | 715/257 |
| 7,277,901 | B2 * | 10/2007 | Parker et al. | 1/1 |
| 7,296,264 | B2 | 11/2007 | Zatloukal et al. | |
| 7,496,053 | B1 * | 2/2009 | Seabaugh et al. | 370/254 |
| 7,607,066 | B2 * | 10/2009 | Gertz et al. | 714/758 |
| 7,613,599 | B2 * | 11/2009 | Bade et al. | 703/14 |
| 2002/0016953 | A1 * | 2/2002 | Sollich | 717/1 |
| 2002/0059425 | A1 * | 5/2002 | Belfiore et al. | 709/226 |
| 2003/0061201 | A1 * | 3/2003 | Grefenstette et al. | 707/3 |
| 2003/0061600 | A1 * | 3/2003 | Bates et al. | 717/133 |
| 2004/0003335 | A1 * | 1/2004 | Gertz et al. | 714/758 |
| 2005/0050547 | A1 * | 3/2005 | Whittle et al. | 719/310 |
| 2005/0097508 | A1 * | 5/2005 | Jacovi et al. | 717/103 |
| 2005/0099407 | A1 * | 5/2005 | Pennington et al. | 345/179 |
| 2005/0114769 | A1 * | 5/2005 | Arkhipov et al. | 715/531 |
| 2005/0125767 | A1 * | 6/2005 | Hawley et al. | 717/100 |

(Continued)

OTHER PUBLICATIONS

Jeronimo Pellegrini, "Secrecy in concurrent version control systems", Instituto de Computacao—Unicamp, Jul. 2007, <http://aleph0.info/apso/2006.sbseg.pdf>, pp. 1-14.*

(Continued)

*Primary Examiner* — Thuy Dao
*Assistant Examiner* — Samuel Hayim
(74) *Attorney, Agent, or Firm* — Gregg Wisdom; Judy Yee; Micky Minhas

(57) ABSTRACT

This document describes techniques for contextually intelligent code editing. In at least some embodiments, the techniques are network-based and can use client-server interactions to develop programming code. For example, input to a local programming environment of a client can be transmitted to a server. A functionality at the server can inspect the input and determine programming options (e.g., programming terms and/or phrases) that are contextually valid in the local programming environment. A list of the programming options can then be transmitted to the client and presented via a user interface. In some embodiments, a selection of one of the programming options can cause the programming option to be populated to the local programming environment, e.g., as part of a user interface associated with the local programming environment. In at least some embodiments, the list of programming options can be cached locally on the client for quick retrieval.

20 Claims, 10 Drawing Sheets

(56) References Cited

U.S. PATENT DOCUMENTS

| | | | |
|---|---|---|---|
| 2005/0229154 A1* | 10/2005 | Hiew et al. | 717/110 |
| 2005/0262428 A1* | 11/2005 | Little et al. | 715/501.1 |
| 2006/0026251 A1* | 2/2006 | Cheng et al. | 709/207 |
| 2006/0026559 A1 | 2/2006 | Gunturi et al. | |
| 2006/0047653 A1* | 3/2006 | Vaidyanathan et al. | 707/6 |
| 2006/0111888 A1* | 5/2006 | Hiew et al. | 703/22 |
| 2006/0112397 A1* | 5/2006 | Raghunandan et al. | 719/313 |
| 2006/0242176 A1* | 10/2006 | Tsyganskiy et al. | 707/100 |
| 2006/0242188 A1* | 10/2006 | Tsyganskiy et al. | 707/102 |
| 2006/0242196 A1* | 10/2006 | Tsyganskiy et al. | 707/103 Y |
| 2006/0242197 A1* | 10/2006 | Tsyganskiy et al. | 707/103 Y |
| 2006/0242207 A1* | 10/2006 | Tsyganskiy et al. | 707/203 |
| 2008/0134142 A1 | 6/2008 | Nathan et al. | |
| 2009/0112753 A1* | 4/2009 | Gupta et al. | 705/38 |
| 2009/0313597 A1* | 12/2009 | Rathbone et al. | 717/100 |
| 2010/0192220 A1* | 7/2010 | Heizmann et al. | 726/19 |
| 2011/0289483 A1* | 11/2011 | Williams et al. | 717/126 |

OTHER PUBLICATIONS

"Code Assistance in the NetBeans IDE Java Editor: A Reference Guide", NetBeans, Jan. 2010, <https://netbeans.org/kb/73/java/editor-codereference.html>, pp. 1-13.*

Yusuke Sakamoto et al., "Improvement and Implementation of Keyword Programming", IEEE, 2010, <http://ieeexplore.ieee.org/stamp/stamp.jsp?tp=&arnumber=5641963>, pp. 1-7.*

Greg Little et al., "Keyword Programming in Java", ACM, 2007, <http://delivery.acm.org/10.1145/1330000/1321646/p84-little.pdf>, pp. 1-10.*

Bruch, et al., "Learning from Examples to Improve Code Completion Systems", Retrieved at << http://www.monperrus.net/martin/Learning-from-Examples-to-Improve-Code-Completion-Systems.pdf >>, Joint 12th European Software Engineering Conference (ESEC) and 17th ACM SIGSOFT Symposium on the Foundations of Software Engineering (FSE-17), Aug. 24-28, 2009, pp. 10.

Hyvönen, et al., "Semantic Autocompletion", Retrieved at << http://museosuomi.cs.helsinki.fi/publications/2006/hyvonen-makela-semantic-autocompletion-2006.pdf >>, 2006, pp. 1-13.

Makarov, et al., "The Big PHP IDE Test: Why Use One and Which to Choose", Retrieved at << http://www.smashingmagazine.com/2009/02/11/the-big-php-ides-test-why-use-oneand-which-to-choose/ >>, Feb. 11, 2009, pp. 16.

"Pex", Retrieved at << http://pexforfum.com >>, Retrieved Date: Oct. 5, 2010, pp. 1.

Kapoor, Rahul "Predicting Source Code: Effectiveness of Prediction based Source Code Auto Completion", Available at <http://citeseerx.ist.psu.edu/viewdoc/download?doi=10.1.1.100.6871&rep=rep1&type=pdf>,(Sep. 2004), 7 pages.

* cited by examiner

CONTEXTUALLY INTELLIGENT CODE EDITING

BACKGROUND

Writing computer programming code can be a confusing and time consuming task. For example, if a user is not familiar with a particular programming language (e.g., C#), it may take a great deal of time and effort for the user to generate programming code in the particular language that can be accurately compiled to perform a desired function. Additionally, each programming language includes a variety of different functions, parameters, methods, and other programming terms that can be included as part of a section of code. Therefore, deciding which programming term is valid or useful in a particular coding context can be difficult and time consuming.

SUMMARY

This document describes techniques for contextually intelligent code editing. In at least some embodiments, the techniques are network-based and can use client-server interactions to develop programming code. For purposes of illustration, consider the following example scenario. A user opens a web browser via a client device and launches a browser-based code editing interface. When the user begins providing input to the code editing interface (e.g., via a keyboard, voice recognition, or other suitable input technique), the input is transmitted to a server. The server inspects the input and determines different code editing options that correspond to the input (e.g., that include characters and/or punctuation from the input) and that are contextually appropriate to the code editing environment. For example, a code editing option can include code classes, namespaces, methods, structs, and so on that can be used to generate executable computer code.

The code editing options are then transmitted back to the client device and presented to the user via the code editing interface. The user can select from the code editing options to cause one of the code editing options to be populated to the code editing interface. In at least some embodiments, the code editing options can be cached locally on the client device to enable the options to be more quickly retrieved.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference number in different instances in the description and the figures may indicate similar or identical items.

DETAILED DESCRIPTION

Example Environment

Figure 1:
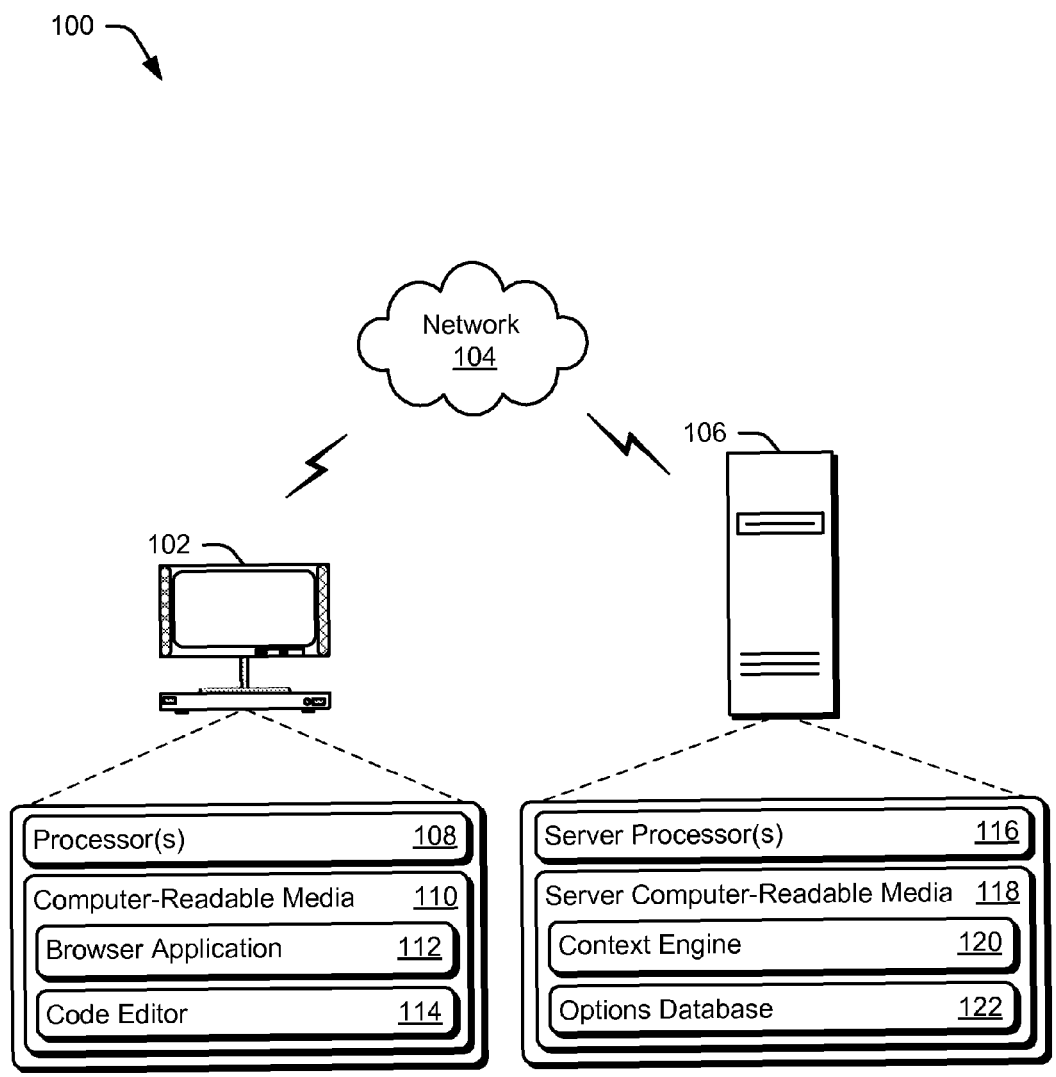
FIG. 1 is an illustration of an environment for contextually intelligent code editing.

FIG. 1 is an illustration of an environment 100 in which techniques for contextually intelligent code editing can operate. Environment 100 includes a computing device 102, a network 104, and a server 106. Computing device 102 is shown as a desktop computer for purposes of example only, and computing device 102 may be embodied as a variety of different types of devices. Server 106 can include a variety of different devices and entities, such as a web server, a local server (e.g., a LAN server), a cloud computing resource, and so on.

As also illustrated in FIG. 1, computing device 102 includes processor(s) 108 and computer-readable media 110. Computer-readable media 110 includes or has access to a browser application 112 and a code editor 114. In at least some embodiments, the browser application 112 and/or the code editor 114 can implement a web-based code editing environment and can be associated with a variety of user interfaces via which a user can enter code editing input.

The server 106 includes server processor(s) 116 and server computer-readable media 118. Server computer-readable media 118 includes or has access to a context engine 120 and an options database 122. In at least some embodiments, the context engine 120 can receive code editing input in a variety of different programming languages from the computing device 102 (e.g., from the code editor 114) and can determine from the options database 122 code editing options that are appropriate based on the code input. For example, the context engine 120 can include and/or have access to a compiler that can analyze programming code in different programming languages and determine contextually valid code editing options based on the programming code and the code editing input. According to some embodiments, the options database 122 can store and/or have access to programming options in a variety of different languages that can be retrieved by the context engine 120.

Note that one or more of the entities shown in FIG. 1 may be further divided, combined, and so on. Generally, any of the functions described herein can be implemented using software, firmware, hardware (e.g., fixed-logic circuitry), manual processing, or a combination of these implementations. The terms "application", "editor", and "engine", as used herein generally represent software, firmware, hardware, whole devices or networks, or a combination thereof In the case of a software implementation, for instance, these terms may represent program code (e.g., computer-executable instructions) that performs specified tasks when executed on a processor (e.g., CPU or CPUs). The program code can be stored in one or more computer-readable memory devices, such as computer-readable media 110 and/or server computer-readable media 118. As utilized herein, computer-readable media can include all forms of volatile and non-volatile memory and/or storage media that are typically associated with a computing device. Such media can include ROM, RAM, flash memory, hard disk, removable media and the like.

Example User Interfaces

FIGS. 2-6 illustrate example user interfaces that can be utilized to implement various techniques discussed herein in accordance with one or more embodiments. In at least some embodiments, the example user interfaces can be generated and/or implemented by the browser application 112 and/or the code editor 114.

Figure 2:
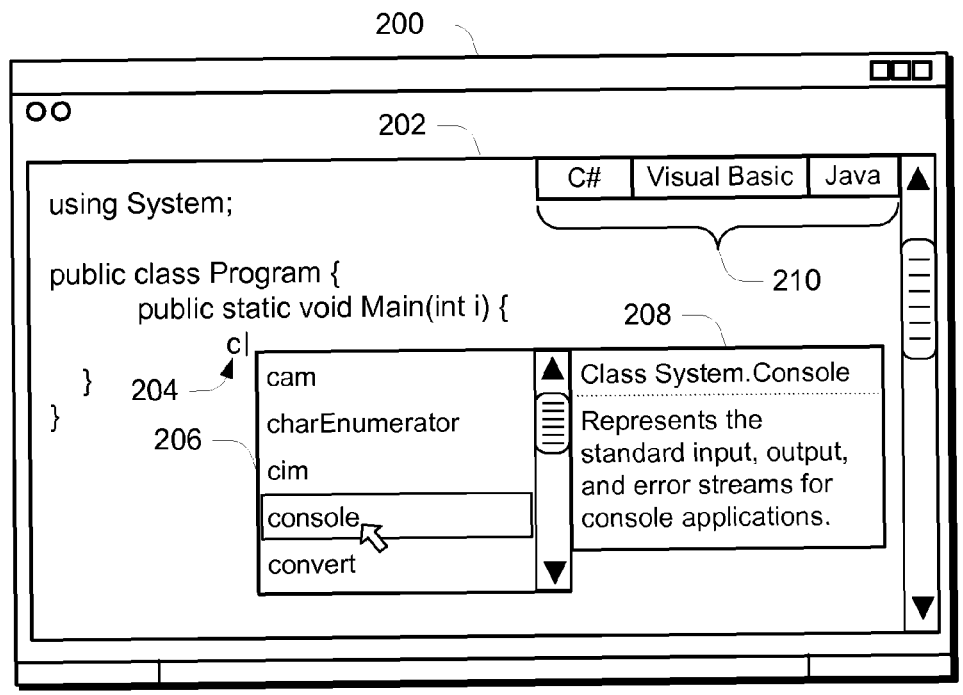
FIG. 2 is an illustration of an example user interface in accordance with one or more embodiments.

FIG. 2 illustrates a user interface 200 that can be used to implement various techniques discussed herein. The user interface 200 includes a programming window 202 that can display code editing information, such as code editing input to a client device (e.g., computing device 102) and/or code editing options transmitted from a remote resource, such as the server 106. According to some embodiments, the user interface 200 is associated with a particular programming language, such as C#, Visual Basic, Java, and so on.

As illustrated in the user interface 200, a user has provided an input 204 in the form of the letter "c". In response to providing the input of the letter "c", the user is presented with a list box 206 that includes a list of programming options that begin with the letter "c". For example, an indication of the input of the letter "c" can be transmitted from the computing device 102 to the server 106. The context engine 120 executing on the server 106 can determine programming options that are appropriate to the particular programming environment of the user interface 200 and that begin with the letter "c". The context engine 120 can then return the programming options to the computing device 102 to be presented via the list box 206. In at least some embodiments, the list box 206 can be navigated (e.g., via scrolling, cursor navigation, and so on) to view the different programming options.

As illustrated, the user has navigated to the term "console" included as part of the list box 206. The navigation can include utilizing keyboard input to navigate among the programming options, using a cursor to focus on the different programming options, and so on. In response to navigating to the term "console", an information box 208 is presented that includes information about the programming option "console". In at least some embodiments, an indication of the navigation to the term "console" can be transmitted from the computing device 102 to the server 106. The context engine 120 can then determine information associated with the term "console" and return the information to be presented via the information box 208.

In this particular example, the information box 208 indicates that "console" is a system class and includes a further description of the console class. In at least some embodiments, information used to populate the information box 208 can be cached locally (e.g., locally on the computing device 102) such that if the user returns subsequently to the programming option "console", the information can be retrieved locally without contacting the server 106.

Also included as part of the user interface 200 are language selectors 210 that can be used to indicate a programming language for the programming environment associated with the user interface 200. In at least some embodiments, each of the language selectors 210 is selectable to select a particular programming language for the programming environment associated with the user interface 200. For example, if one of the language selectors 210 is selected, an indication of the selection (e.g., the particular programming language) can be transmitted to the server 106 to be used to determine appropriate programming options.

Figure 3:
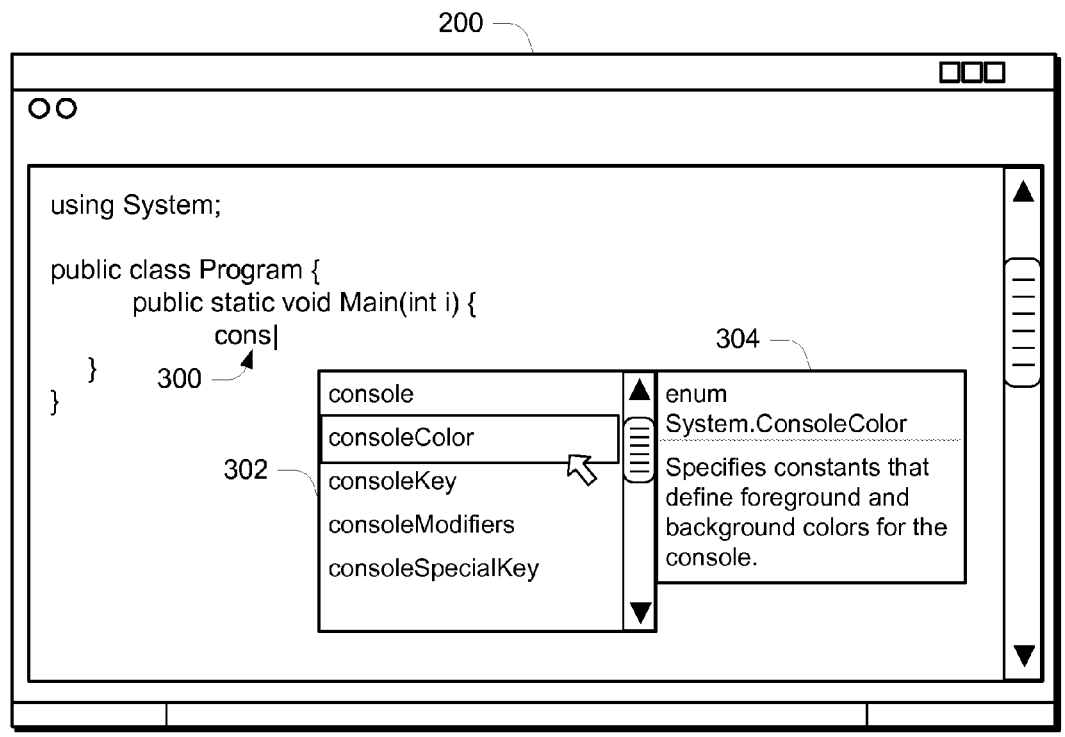
FIG. 3 is an illustration of an example user interface in accordance with one or more embodiments.

FIG. 3 illustrates an additional example implementation of the user interface 200 in accordance with one or more embodiments. As illustrated, a user has provided additional input 300 via additional characters after the letter "c" e.g., the letters "o", "n", and "s". In response to the additional input 300, a list box 302 is presented that includes programming options that include the characters "cons". In at least some embodiments, an indication of the additional characters is transmitted from the computing device 102 to the server 106 (e.g., to the context engine 120), which then returns the appropriate programming options.

According to some embodiments, when characters are added or deleted as part of programming-related input, the difference between current programming input and previous programming input is used to determine programming options. For example, in the scenario presented in FIG. 3, the server 106 previously received an indication of the input of the letter "c", as discussed above with reference to FIG. 2. The server can store this indication (along with other information from the user interface 200) as a current state of the associated programming environment. When additional input is provided (e.g., the additional input 300), only the difference between the additional input and the previous input (e.g., the characters "ons") is transmitted to the server 106. This can save network bandwidth and can allow for a faster return of programming related options from the server 106.

Further to the discussion of FIG. 3, the user has navigated to the programming option "consoleColor" included as part of the list box 302. Responsive to this navigation, an information box 304 is presented that includes information about the consoleColor programming option. As discussed above and below, the navigation to different programming options can be communicated from the computing device 102 to the server 106, and the presentation of information related to the programming options can returned from the server 106 to the computing device 102 and cached locally on the computing device.

Figure 4:
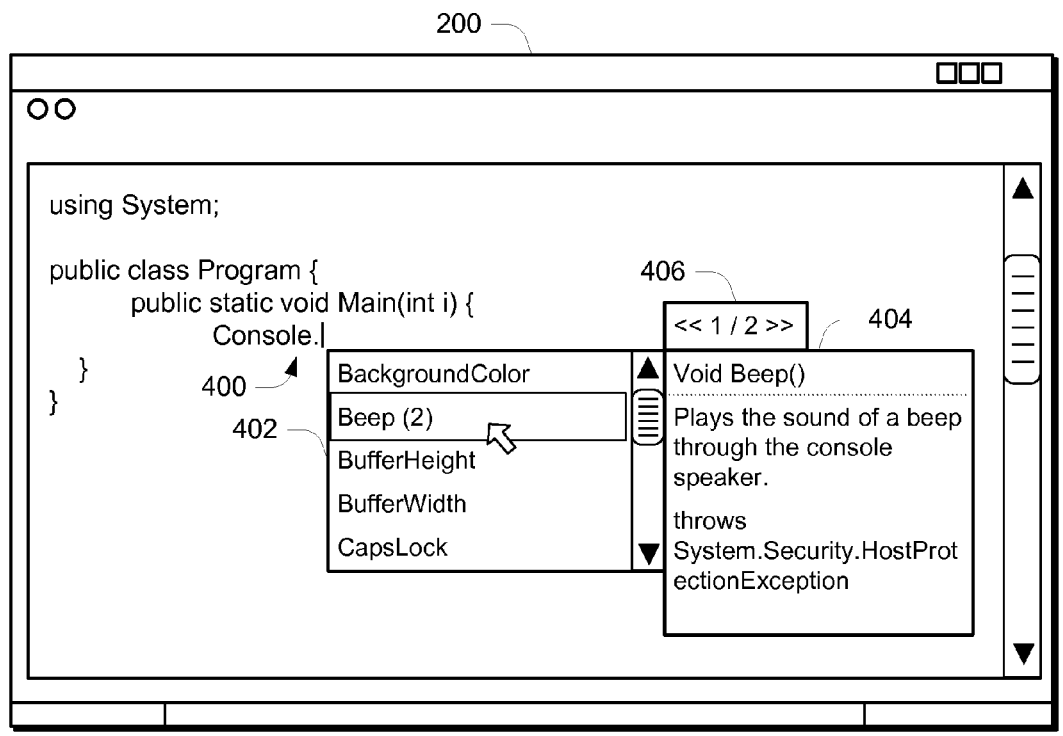
FIG. 4 is an illustration of an example user interface in accordance with one or more embodiments.

FIG. 4 illustrates an additional example implementation of the user interface 200 in accordance with one or more embodiments. As illustrated, a user has provided further input 400, either by the input of additional characters (e.g., "ole.") or by selecting the "console" option from the list box 302 of FIG. 3 and adding a period to the end of the term. According to some embodiments, the input of certain punctuation (e.g., a period, a parenthesis, a comma, and so on) can cause additional programming options to be retrieved. For example, the addition of the period at the end of "console" can cause programming options associated with the console class to be retrieved from a remote resource (e.g., the server 106) and displayed via a list box 402. In at least some embodiments, the additional programming options to be retrieved (e.g., from the server 106) and cached locally, such as on the computing device 102.

Also in some embodiments, the addition of punctuation can cause a term to be auto-corrected. For example, as indicated in the input 300 of FIG. 3, the term "console" was originally input with a lower-case "c". When the period was input as part of the input 400, however, the lower-case "c" was auto-corrected (e.g., by the code editor 114) to an upper-case "C". This auto-correction is simply one example, and the techniques discussed herein can utilize a variety of different types of auto-correction.

Additionally, and responsive to a navigation within the list box 402, information about the programming options listed within the list box 402 can be displayed via an information box 404. In this particular example, the user has navigated to a "beep" method associated with the console class, and information about the "beep" method is displayed in the information box 404.

Also illustrated is a versions box 406, which can enable navigation between different versions of a programming option displayed in the list box 402. In this particular example, the "beep" method includes two different versions, which can each be selected by navigating to the different versions via the versions box 406.

Figure 5:
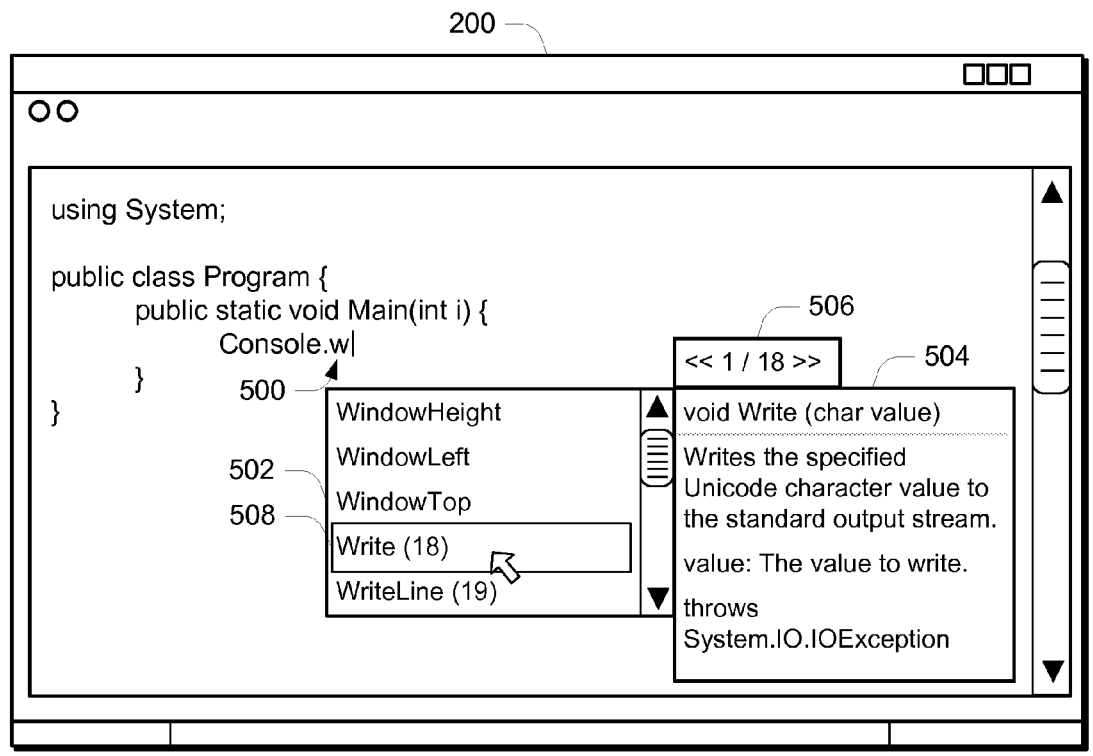
FIG. 5 is an illustration of an example user interface in accordance with one or more embodiments.

FIG. 5 illustrates an additional example implementation of the user interface 200 in accordance with one or more embodiments. As illustrated in this particular example, a user has provided further input 500 by inputting a "w" after the term "console.", and a list box 502 is displayed that includes programming options that include the term "console.w". In this example, the list box 502 includes a subset of the programming options from the list box 402 of FIG. 4 that begin with the term "console.w". For example, the addition of the further input 500 can cause an automatic sorting of the cached list of programming options included as part of the list box 402 to display programming options that include the term "console.w".

Also illustrated as part of FIG. 5 are an information box 504 and a versions box 506. In at least some embodiments, the information box 504 includes information about a programming option 508 that is navigated to in the list box 502. Additionally, the versions box 506 can be used to navigate between versions of the programming option 508.

Figure 6:
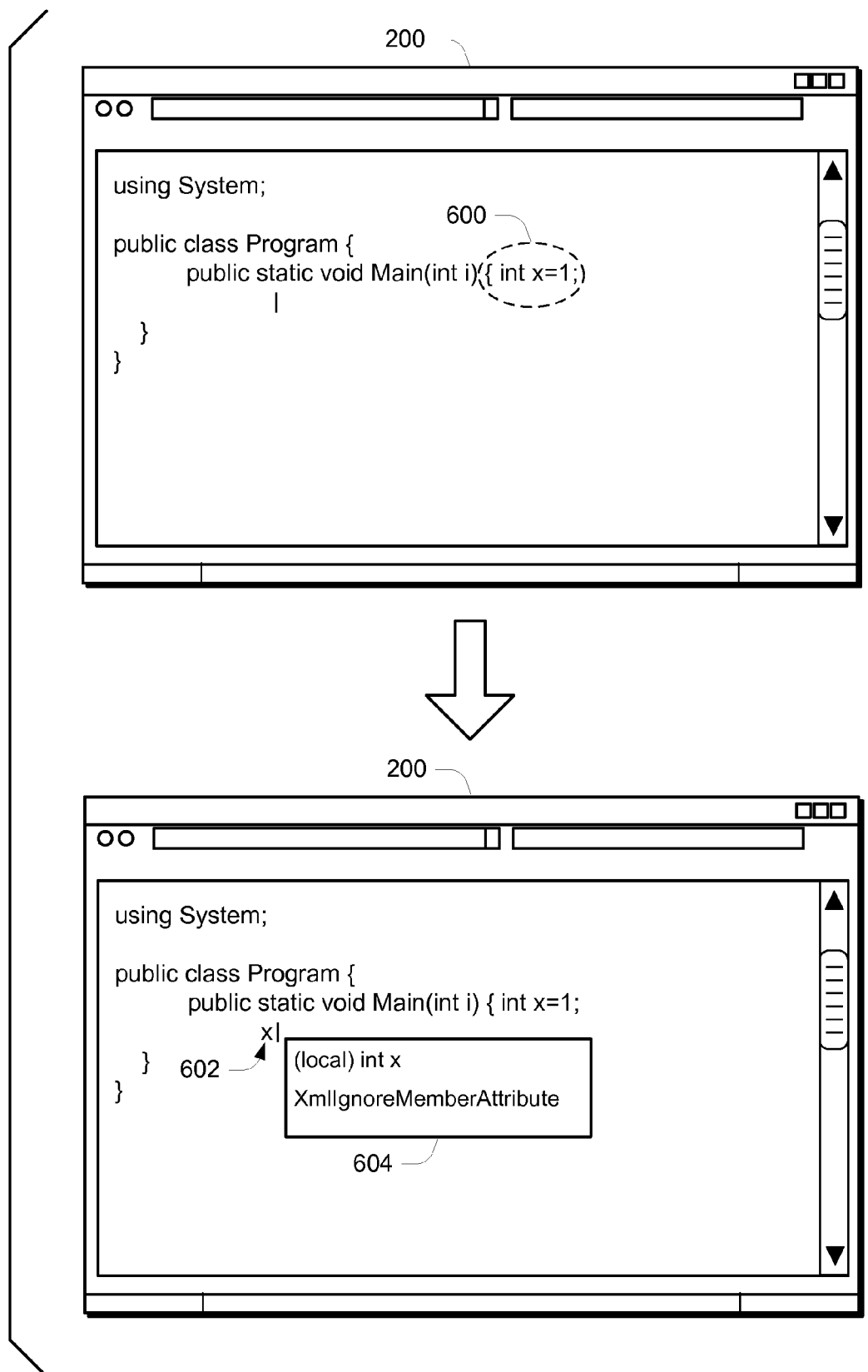
FIG. 6 is an illustration of an example user interface in accordance with one or more embodiments.

FIG. 6 illustrates an additional example implementation of the user interface 200 in accordance with one or more embodiments. In this example, a user has entered an input 600 that defines a variable x (i.e., "x=1"). According to some embodiments, when a variable is defined and/or if values are provided for a programming term (e.g., a method, a function, and so on), the server 106 can be notified of the variable definition and/or the values for the programming term. If the user subsequently inputs the variable and/or programming term to the user interface 200, the user can be notified that a definition exists for the variable and/or that values exist for the programming term.

In this particular illustrated embodiment, after the user has entered the input 600, the user goes to a new line and enters an input 602 that includes the letter "x". In response to the input 602 being entered, a list box 604 is presented that includes an indication that a local value has been provided for the x variable, i.e., "(local) int x". Thus, the user can be notified that a local definition for the x variable has previously been provided. In addition to the indication of the local value for x, the list box 604 includes a programming term that begins with the letter x.

Example Processes For Provider-Specific Parsing

The following discussion describes example processes for provider-specific parsing for retrieving content. Aspects of these processes may be implemented in hardware, firmware, software, or a combination thereof These processes are shown as sets of blocks that specify operations performed, such as through one or more entities of FIG. 1, and are not necessarily limited to the order shown for performing the operations by the respective blocks. In portions of the following discussion reference may be made to environment 100 of FIG. 1, though these are not necessarily required.

Figure 7:
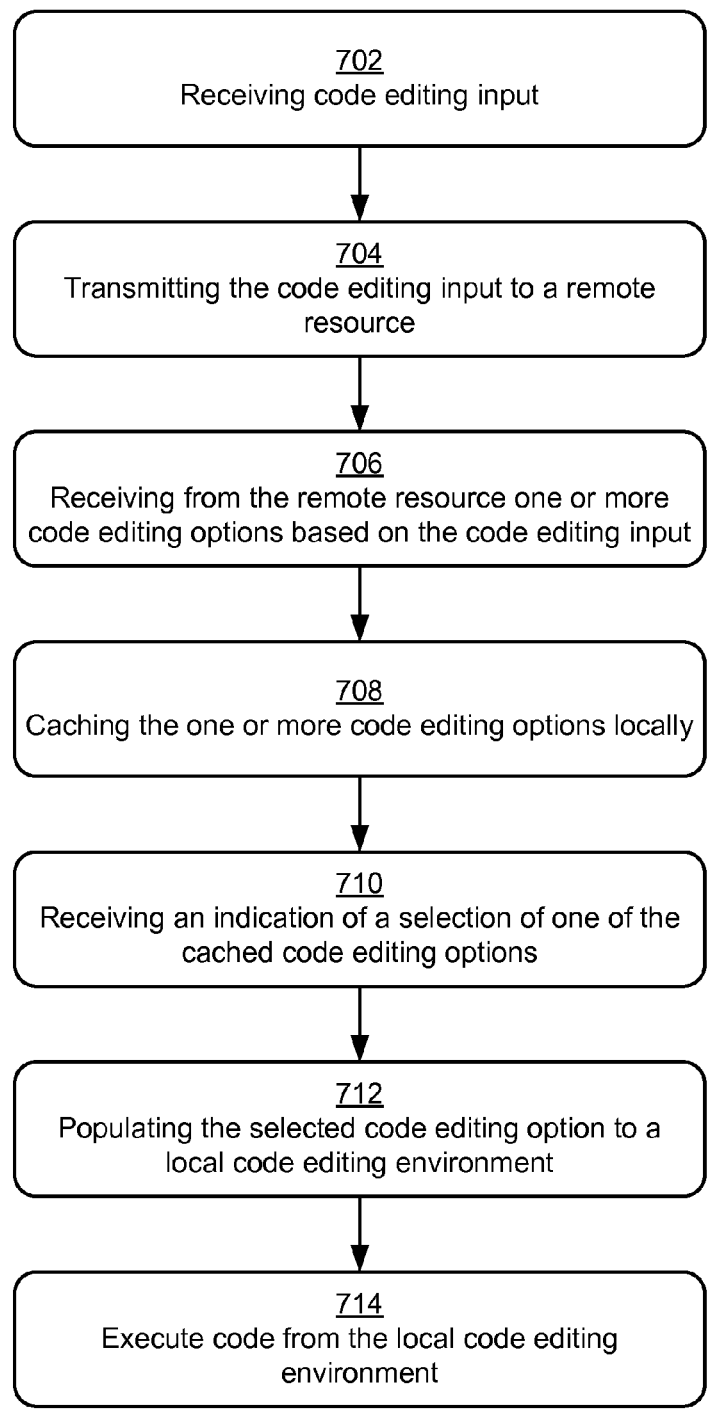
FIG. 7 is a flow diagram depicting an example process for receiving code editing options in accordance with one or more embodiments.

FIG. 7 is a flow diagram depicting an example process 700 for intelligent code editing. Block 702 receives code editing input. For example, a user can input a character to a user interface associated with a programming environment, such as the user interface 200 discussed above. Block 704 transmits the code editing input to a remote resource. Continuing with the current example, an indication of the character input to the user interface 200 can be transmitted to the server 106. According to some embodiments, the context engine 120 on the server 106 can use the character input to determine programming options that include the character input and that are contextually appropriate to the programming environment of the user interface 200. For example, the context engine 120 can determine programming options that are semantically valid in a particular programming language and/or in consideration of existing programming code in the programming environment. In at least some embodiments, the programming options can include programming terms retrieved from the terms database 122.

Block 706 receives from the remote resource code editing options based on the code editing input. Continuing with the current example, the computing device 102 can receive the code editing options from the server 106 and can display the code editing options in the user interface 200, e.g., as part of a list box of code editing options. Block 708 caches the code editing options locally. For example, the code editing options can be stored in a memory cache maintained by the computer-readable media 110 of the computing device 102.

Block 710 receives an indication of a selection of one of the cached code editing options. Continuing with the ongoing example, a user can select a code editing option from a list box displayed as part of the user interface 200. Block 712 populates the selected code editing option to a local code editing environment. For example, the selected code editing option can be included as part of a line of programming code displayed in the user interface 200. Block 714 executes programming code included as part of the local code editing environment. Continuing with the ongoing example, the programming code included in the user interface 200 can be compiled and executed to perform a particular function or functions.

Figure 8:
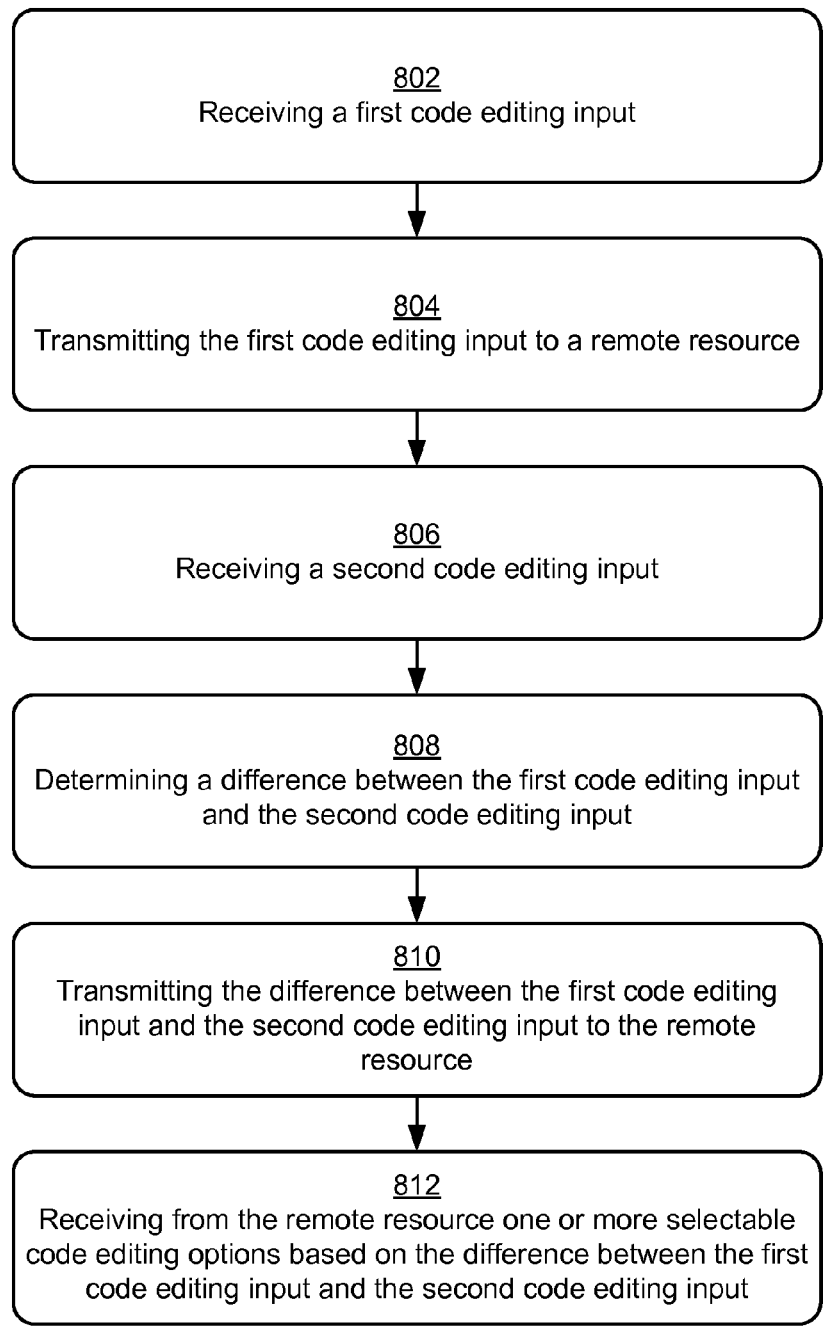
FIG. 8 is a flow diagram depicting an example process for using differencing to determine code editing options in accordance with one or more embodiments.

FIG. 8 is a flow diagram depicting an example process 800 for utilizing differencing in intelligent code editing. Block 802 receives a first code editing input. For example, code editing input can be received via the user interface 200. Block 804 transmits the first code editing input to a remote resource. For example, the code editing input can be transmitted from the computing device 102 to the server 106. Block 806 receives a second code editing input. For example, the second code editing input can include an addition to the first code editing input, such as additional characters and/or punctuation.

Block 808 determines a difference between the first code editing input and the second code editing input. According to some embodiments, the difference can include the additional characters and/or punctuation that were added via the second code editing input. Block 810 transmits the difference between the first code editing input and the second code editing input to the remote resource. Continuing the ongoing example, the additional characters and/or punctuation that were added via the second code editing input can be transmitted to the remote resource without re-transmitting the first code editing input.

Block 812 receives from the remote resource one or more selectable code editing options based on the difference between the first code editing input and the second code editing input. According to some embodiments, the selectable code editing options can be displayed via the user interface 200.

Figure 9:
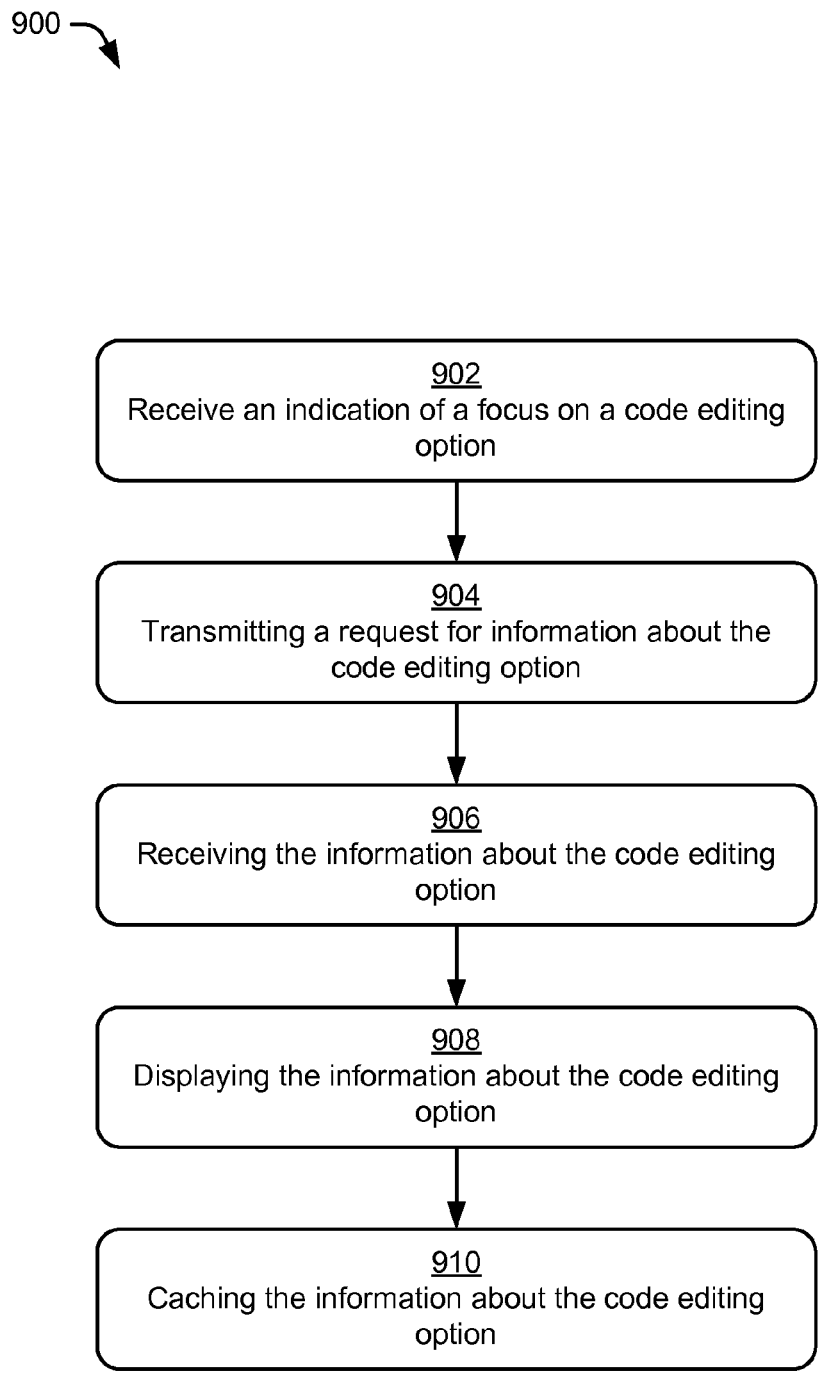
FIG. 9 is a flow diagram depicting an example process for receiving information about a code editing option.

FIG. 9 is a flow diagram depicting an example process 900 for retrieving information about a code editing option. Block 902 receives an indication of a focus on a code editing option. For example, a user can hover a cursor over a code editing option and/or navigate through a list of code editing options using a suitable type of input, such as keyboard input, touch input, voice input, and so on. In at least some embodiments, the code editing option can be displayed in a list box, such as list box 206 of the user interface 200.

Block 904 transmits a request for information about the code editing option. In at least some embodiments, the request can be transmitted responsive to receiving the indication of the focus on the code editing option. For example, the request can be transmitted from the computing device 102 to the server 106. Block 906 receives the information about the code editing option. In at least some embodiments, the information can be received by the computing device 102 from the server 106. Block 908 displays the information about the code editing option. For example, the information can be displayed via the user interface 200.

Block 910 caches the information about the code editing option. In at least some embodiments, the information can be cached locally on the computing device 102. Caching the information locally enables the information to be retrieved quickly if the user navigates to the code editing option at a later time. Also in some embodiments, the code editing option is associated with an identifier that is cached locally on the computing device 102. If a user subsequently navigates to the code editing option (e.g., via a list box of the user interface 200), the computing device 102 can use the identifier to retrieve the information about the code editing option.

Figure 10:
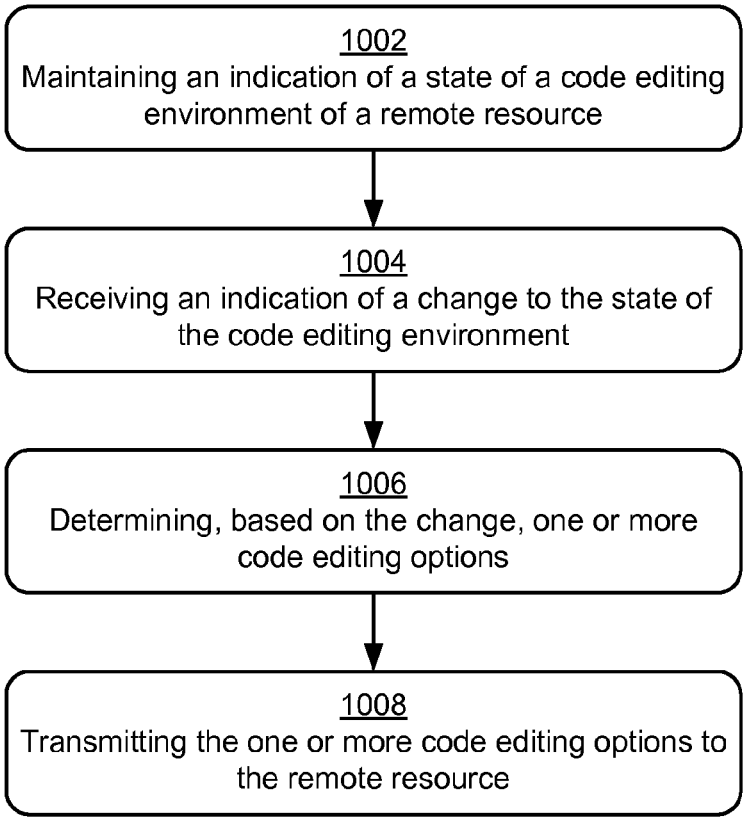
FIG. 10 is a flow diagram depicting an example process for using a change in a state of a code editing environment to determine code editing options in accordance with one or more embodiments.

FIG. 10 is a flow diagram depicting an example process 1000 for monitoring a state of a code editing environment as part of intelligent code editing. Block 1002 maintains an indication of a state of a code editing environment of a remote resource. For example, the server 106 can maintain a local version of a state of a programming environment of the computing device 102. The state of the programming environment can include programming code and/or other input that is provided to the user interface 200 on the computing device 102.

Block 1004 receives an indication of a change to the state of the code editing environment. According to some embodiments, the change to the state can include a character or characters, punctuation, terms, and/or phrases that are added to or deleted from the code editing environment. For example, the change to the state can include input to the user interface 200 that is transmitted from the computing device 102 to the server 106. Block 1006 determines, based on the change to the state of the code editing environment, one or more code editing options. According to some embodiments, the context engine 120 can use the change to the state of the code editing environment to update the indication the state of the code editing environment maintained by the server 106. The context engine 120 can then use the updated state to determine code editing options that are appropriate to the updated state.

Block 1008 transmits the one or more code editing options to the remote resource. According to some embodiments, the code editing options can be transmitted from the server 106 to the computing device 102. Selectable versions of the code editing options can be displayed via the user interface 200 and can be selected by a user and populated to the code editing environment of the computing device 102.

Conclusion

This document describes techniques for contextually intelligent code editing. These techniques enable a user to be presented with programming options (e.g., programming terms) that are contextually valid in a particular programming environment. Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A system comprising:
one or more processors; and
one or more computer readable media storing computer executable instructions that are executable by the one or more processors to cause the one or more processors to perform operations including:
transmitting to a remote resource a first code editing input that is input to a local code editing environment, the remote resource being a web server;
receiving from the remote resource and based on the first code editing input, one or more code editing options that are contextually valid in the local code editing environment;
receiving a second code editing input as an addition to the first code editing input to the local code editing environment;
transmitting to the remote resource an indication of a difference between the first code editing input and the second code editing input without re-transmitting the first code editing input;
receiving, from the remote resource and based on the indication of the difference between the first code editing input and the second code editing input, one or more additional code editing options being contextually valid in the local code editing environment;
providing an indicator associated with an additional code editing option of the one or more additional code editing options that indicates a number of multiple different versions of the additional code editing option;
responsive to selection of the additional code editing option, initiating a display of a user interface instrumentality configured to enable navigation between the multiple different versions of the additional code editing option;
receiving a selection of one of the multiple different versions of the additional code editing option; and
causing the selected one of the multiple different versions of the additional code editing option to be populated to the local code editing environment.

2. The system as recited in claim 1, wherein transmitting the indication of the difference between the first code editing input and the second code editing input comprises transmitting the indication of the difference to the web server via a web-based code editing environment.

3. The system as recited in claim 1, wherein the second code editing input comprises one or more of characters or punctuation that are added to the first code editing input, and wherein the difference comprises the one or more of characters or punctuation.

4. The system as recited in claim 1, wherein the code editing options comprise one or more computer code terms that are semantically valid in the local code editing environment.

5. The system as recited in claim 1, wherein the one or more code editing options are determined by a context engine at the web server.

6. The system as recited in claim 1, wherein receiving the selection of the additional code editing option comprises receiving the selection via input to a user interface.

7. The system as recited in claim 1, wherein the local code editing environment comprises a user interface that is configured to enable programming in a variety of different computer programming languages.

8. The system as recited in claim 1, wherein causing the selected one of the multiple different versions of the additional code editing option to be populated to the local code editing environment comprises causing the selected one of the multiple different versions of the additional code editing option as part of a line of programming code.

9. The system as recited in claim 1, wherein the operations further include displaying information about the one of the multiple different versions of the additional code editing option responsive to a focus on the one of the multiple different versions of the additional code editing option.

10. A computer-implemented method comprising:
transmitting a first code editing input to a web server;
receiving a second code editing input;
determining a difference between the first code editing input and the second code editing input;
transmitting the difference between the first code editing input and the second code editing input to the web server without re-transmitting the first code editing input;
receiving from the web server one or more different selectable code editing options based on the difference between the first code editing input and the second code editing input;
providing an indicator associated with a particular code editing option of the one or more different selectable code editing options that indicates a number of multiple different versions of the particular code editing option; and
responsive to a focus on the particular code editing option, initiating a display of a user interface instrumentality that is selectable to cause navigation between a first display of information associated with one the multiple different versions of the particular code editing option and a second display of information associated with an additional one of the multiple different versions of the particular code editing option.

11. The method as recited in claim 10, wherein the difference between the first code editing input and the second code editing input comprises one or more of characters or punctuation added to the first code editing input.

12. The method as recited in claim 10, wherein the one or more different selectable code editing options comprise one or more computer programming terms.

13. The method as recited in claim 10, further comprising:
displaying the one or more different selectable code editing options;
receiving a selection of one of the one or more different selectable code editing options; and
causing the one of the one or more different selectable code editing options to be populated as part of a line of computer code in a code editing environment.

14. The method as recited in claim 10, further comprising:
caching the one or more different selectable code editing options locally; and
causing the one or more different code editing options to be displayed as part of a web-based code editing environment.

15. A computer-implemented method comprising:
maintaining, at a web server, an indication of a state of a code editing environment of a remote resource based on a first input to the code editing environment received from the remote resource;
receiving an indication of a change to the state of the code editing environment of the remote resource that indicates a difference between the first input to the code editing environment and a second input to the code editing environment of the remote resource, without re-receiving the first input;
receiving an indication of a user-selected programming language for the code editing environment of the remote resource;
determining, at the web server and based on the change to the state of the code editing environment, one or more selectable code editing options that are contextually valid in the code editing environment and based on the user-selected programming language for the code editing environment, at least one code editing option of the one or more selectable code editing options having multiple different versions that are individually selectable to populate into the code editing environment at the remote resource; and
transmitting the one or more selectable code editing options to the remote resource effective to enable the one or more selectable code editing options to be selected and populated to the code editing environment of the remote resource, the at least one code editing option being transmitted with an indicator configured to notify a user of the remote resource of a number of the multiple different versions that are associated with the at least one code editing option.

16. The method as recited in claim 15, wherein the difference between the first input and the second input comprises one or more of characters or punctuation added to or deleted from the first input.

17. The method as recited in claim 15, wherein the one or more selectable code editing options comprise computer programming terms that are semantically valid in the code editing environment of the remote resource.

18. The method as recited in claim 15, wherein the one or more selectable code editing options transmitted to the remote resource include one or more of a class, namespace, method, or struct.

19. The method as recited in claim 15, wherein the indication of the change to the state of the code editing environment includes a pre-defined variable, the method further comprising:
notifying a user of the remote resource that a local definition for the pre-defined variable has previously been provided; and
including in the one or more selectable code editing options being transmitted to the remote resource one or more programming terms that begin with a character matching a character used for the pre-defined variable.

20. The system as recited in claim 1, wherein the operations further include caching locally the one or more code editing options and the one or more additional code editing options.

* * * * *